(12) United States Patent
Brady et al.

(10) Patent No.: US 6,285,342 B1
(45) Date of Patent: Sep. 4, 2001

(54) RADIO FREQUENCY TAG WITH MINIATURIZED RESONANT ANTENNA

(75) Inventors: Michael John Brady, Brewster; Dah-Weih Duan, Yorktown Heights; Venkata S. R. Kodukula, Yorktown Hgts., all of NY (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 09/423,063

(22) Filed: Oct. 29, 1999

Related U.S. Application Data

(63) Continuation-in-part of application No. PCT/US98/23121, filed on Oct. 30, 1998.

(51) Int. Cl.⁷ ........................................... H01Q 1/36
(52) U.S. Cl. ........................... 343/895; 343/795; 235/491
(58) Field of Search .................................... 343/895, 795, 343/793, 803, 806, 796; 235/449, 491, 493; H01Q 1/36

(56) References Cited

U.S. PATENT DOCUMENTS

| | | |
|---|---|---|
| Re. 24,413 | 1/1958 | Weiss . |
| 3,689,929 | 9/1972 | Moody . |
| 4,604,628 | 8/1986 | Cox . |
| 4,812,855 | 3/1989 | Coe et al. . |
| 4,987,323 | 1/1991 | Fujita . |
| 5,030,940 * | 7/1991 | Siikarla ................................. 343/895 |
| 5,182,570 * | 1/1993 | Nysen et al. .......................... 343/795 |
| 5,489,914 | 2/1996 | Breed . |
| 5,528,222 | 6/1996 | Moskowitz et al. . |
| 5,541,399 * | 7/1996 | De Vall ................................. 343/895 |
| 6,118,379 * | 9/2000 | Kodukula et al. ............ 343/700 MS |
| 6,127,989 * | 10/2000 | Kunz ................................... 343/895 |

OTHER PUBLICATIONS

"Antenna Theory Analysis and Design" By Constantine A. Balanis, West Virginia University, pp. 496–501.

"The ARRL Antenna Book" By The American Radio Relay League, 1988, pp. 2–3–2–6, 8–34, 24, 24–12.

\* cited by examiner

*Primary Examiner*—Hoanganh Le
(74) *Attorney, Agent, or Firm*—O'Melveny & Myers LLP

(57) ABSTRACT

An RF transponder is provided with a miniature resonant antenna that can fit on a small form factor the size of a button or coin. More particularly, the RF transponder comprises a substrate and an RF integrated circuit disposed thereon. An antenna is provided on the substrate and is electrically connected to the RF integrated circuit. The antenna has a contorted shape that permits it to fit into the limited available space on the substrate, while having an electrical length that is greater than a maximum length dimension of the substrate. Possible shapes for the antenna may include a meander antenna, a non-uniform meander antenna, a bent dipole antenna, a spiral antenna, a z-shaped dipole, a squeezed dipole antenna, or a combination of any of the antenna types. The RF transponder may further include at least one loading bar spaced from the antenna and/or at least one tuning stub coupled to the antenna.

21 Claims, 6 Drawing Sheets

RADIO FREQUENCY TAG WITH MINIATURIZED RESONANT ANTENNA

RELATED APPLICATION

This application is a continuation-in-part of co-pending International Application Serial No. PCT/US98/23121, filed Oct. 30, 1998.

BACKGROUND OF THE INVENTION

1. Field of the Invention

The present invention relates to radio frequency (RF) transponders such as radio frequency identification (RFID) transponders, and more specifically, to an RFID transponder adapted to a small form factor, such as a button or coin.

2. Description of Related Art

In the automatic data identification and collection industry, the use of RF transponders (also known as RF tags) has grown in prominence as a way to track data regarding an object to which an RF tag is affixed. An RFID tag is a type of RF tag that further includes a semiconductor memory in which information may be stored. An RFID interrogator containing a transmitter-receiver unit is used to query an RFID tag that may be at a distance from the interrogator. The RFID tag detects the interrogating signal and transmits a response signal containing encoded data back to the interrogator. RF and RFID systems are used in applications such as inventory management, security access, personnel identification, factory automation, automotive toll debiting, and vehicle identification, to name just a few.

These RFID systems provide certain advantages over conventional optical indicia recognition systems (e.g., bar code symbols). For example, the RFID tags may have a memory capacity of several kilobytes or more, which is substantially greater than the maximum amount of data that may be contained in a bar code symbol. The RFID tag memory may be re-written with new or additional data, which would not be possible with a printed bar code symbol. Moreover, RFID tags may be readable at a distance without requiring a direct line-of-sight view by the interrogator, unlike bar code symbols that must be within a direct line-of-sight and which may be entirely unreadable if the symbol is obscured or damaged. An additional advantage of RFID systems is that several transponders may be read by the interrogator at one time.

Since it is very desirable to include RF and RFID systems in compact applications, there is a critical need for RF and RFID tags having very small form factors, such as the size of a button or coin. Such small form factor RF transponders could be embedded in buttons for use in items of clothing, or in key chains, garment tags or parcel tags. A limiting factor in the fabrication of such an RF tag is the antenna. RF tags typically employ an antenna formed on a substrate and electrically connected to an integrated circuit. Various antenna configurations are known in the art, such as dipoles, meander dipoles, patches, etc. A typical dipole antenna has a physical length on the substrate of approximately one-half wavelength ($\lambda/2$) of the operative frequency of the transponder. For example, an RF tag that operates in the 2.45 GHz frequency range may have a dipole antenna approximately six centimeters long. Although this physical length is very small, it is nevertheless larger than a button or coin.

Accordingly, it would be very desirable to provide an RF transponder having a small form factor the size of a button or coin. More particularly, it would be very desirable to provide an RF transponder having an antenna covering a physical area that is smaller than approximately one-half wavelength ($\lambda/2$) of the operative frequency of the transponder.

SUMMARY OF THE INVENTION

In accordance with the teachings of the present invention, an RF transponder is provided with a miniature resonant antenna that can fit on a small form factor the size of a button or coin.

More particularly, the RF transponder comprises a substrate and an RF integrated circuit disposed thereon. An antenna is provided on the substrate and is electrically connected to the RF integrated circuit. The antenna has a contorted shape that permits it to fit into the limited available space on the substrate, while having an electrical length that is greater than a maximum length dimension of the substrate. Possible shapes for the antenna may include a meander antenna, a non-uniform meander antenna, a bent dipole antenna, a spiral antenna, a z-shaped dipole, a squeezed dipole antenna, or a combination of any of the antenna types. The RF transponder may further include at least one loading bar spaced from the antenna and/or at least one tuning stub coupled to the antenna.

A more complete understanding of the RF tag having a miniaturized resonant antenna will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

The above and further features, aspects, and advantages, of the invention will be apparent to those skilled in the art from the following detailed description, taken together with the accompanying drawings in which.

DETAILED DESCRIPTION OF THE PREFERRED EMBODIMENT

The present invention satisfies the need for an RF transponder having a small form factor that is approximately the size of a button or coin. More particularly, the present invention satisfies the need for an RF transponder having an antenna covering a physical area that is smaller than approximately one-half wavelength (λ/2) of the operative frequency of the transponder.

Figure 1:
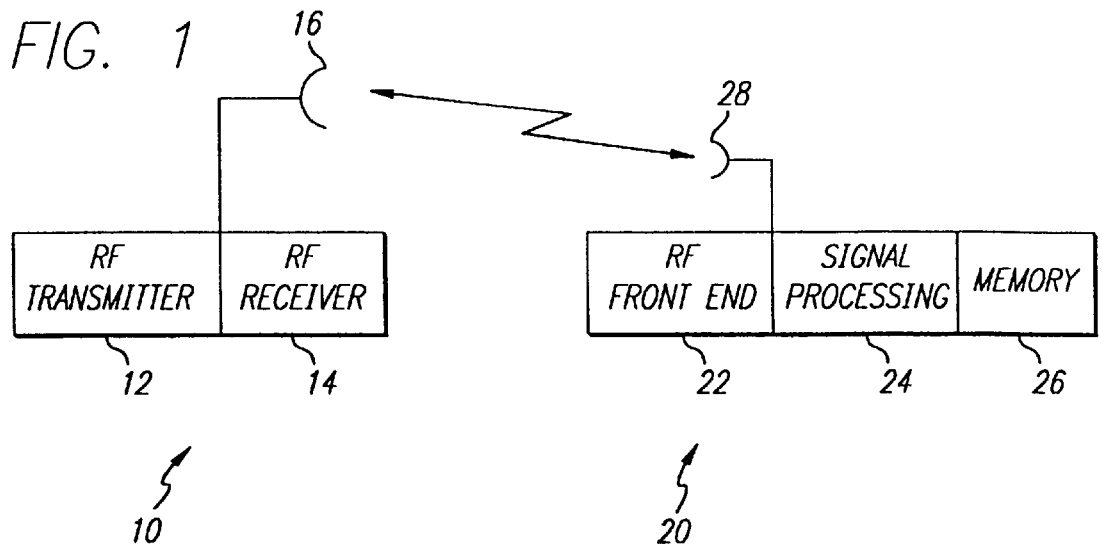
FIG. 1 is a block diagram of an RF system in accordance with the principles of the invention.

Referring first to FIG. 1, an RF system in accordance with the principles of the present invention is illustrated. An RF interrogator 10 includes an RF transmitter 12, an RF receiver 14, and an antenna 16 connected to the transmitter and receiver. The base station 10 may be fixedly located (e.g., central base station), hand-held (e.g., a hand-held portable data collection terminal or computer), or mounted to a vehicle (e.g., a forklift, delivery truck, etc.). The interrogator 10 generates a radio frequency interrogation field suitable for interrogating the RF tag 20.

An RF tag 20 such as may be used in conjunction with the base station 10 includes an RF front end 22, a signal processing section 24, a memory 26, and an antenna 28. The front end 22 may be any known front end design used with an antenna 28. The signal processing section 24 may include logic circuits for processing data. The memory 26 permits the storage and retrieval of data. The RF front end 22, the signal processing section 24, and the memory 26 may be combined within a single integrated circuit, such as an application specific integrated circuit (ASIC). The antenna 28 enables the RF front end 22 to detect an interrogating field, and/or, where appropriate, a programming field. The antenna 28 also serves to transmit a response to an interrogating field from the RF interrogator 10. The RF tag 20 modulates and backscatters the interrogating field to provide a response signal comprising encoded data to the receiver of the interrogator 10. The data encoded in the response signal may be as simple as 1-bit or the data may be a serial stream providing a substantial amount of data to the interrogator 10. The RF signal transmitted by the interrogator 10 must have sufficient field strength, taking into account the polarization of the signal and of the tag's antenna, at the location of the tag 20 for the tag to detect the RF signal.

Figure 2:
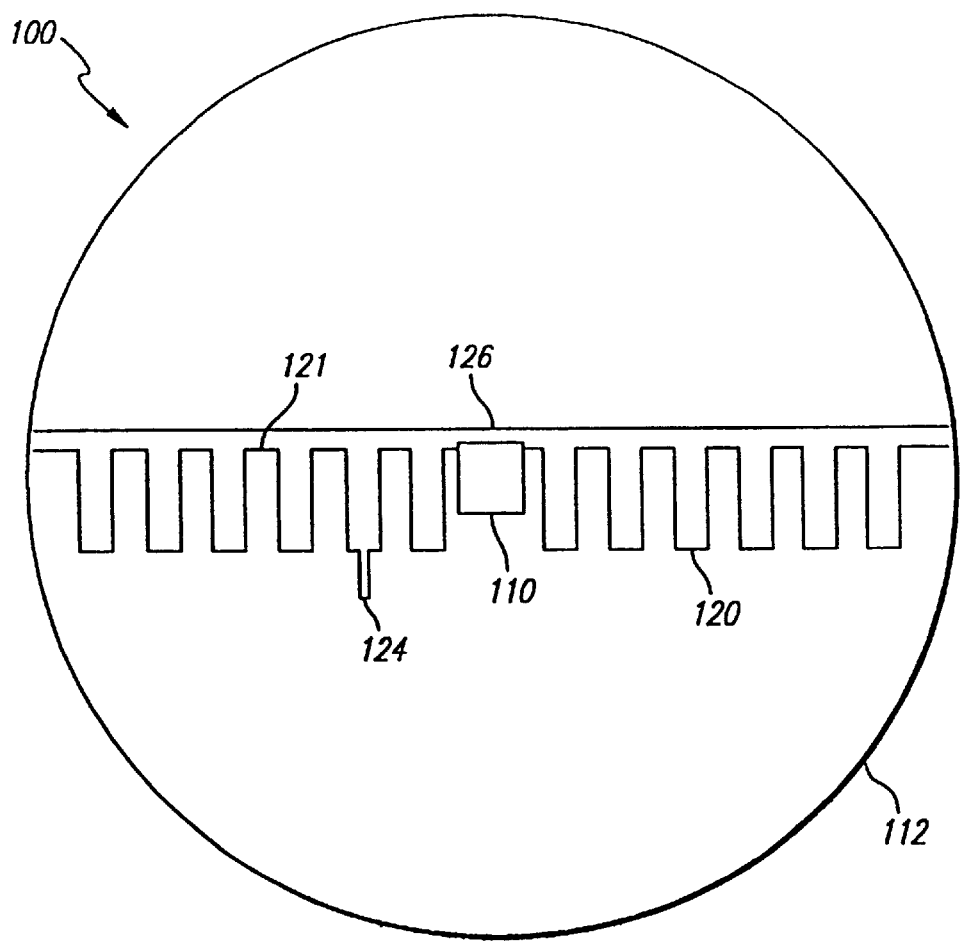
FIG. 2 is a top plan view of an exemplary RF tag which employs RF tag circuitry in the form of an RF tag integrated circuit (IC) connected to a meander antenna.

A first embodiment of an RF tag 100 in accordance with the principles of the invention is illustrated in FIG. 2. The RF tag 100 includes an RF integrated circuit (IC) 110 that is affixed in a conventional manner to a substrate 112. The substrate may be comprised of a flexible organic material, such as polyimide or polyester, or alternatively may be comprised of a rigid circuit board material, such as FR-4. As shown in FIG. 2, the substrate 112 has a generally circular or oval shape with a diameter approximately equivalent to a button or coin (e.g., less than 4 cm). A meander antenna having dipole elements 120, 121 is coupled to the RF IC 110. The meander antenna is provided from a thin pattern (typically 18 to 35 micron thick) of a conductive metal, such as copper. This pattern may be formed by plating or adhering or screening a thin layer of conductive metal onto a substrate, which is etched to form the specific geometric configuration of the antenna. The meander antenna may employ one or more loading bars, such as loading bar 126 and/or one or more turning stubs 124 to match the impedance of the antenna to the RF IC 110. Although the illustrated meanders are rectangular in shape, the meanders may be of any of a variety of shapes, including sinusoidal, clipped rectangular, and triangular. One or more tuning stubs, such as the tuning stub 124, may be placed in any of a wide variety of locations along the length of the dipole elements 120, 121 and in any of a wide variety of orientations. Since the shape of the antenna will change its impedance characteristics, the loading bars 126 and/or tuning stubs 124 may be used to obtain an impedance match with the RF IC 110.

The use of the meander antenna, rather than a straight dipole antenna, permits the antenna to fit within the relatively small form factor defined by the substrate 112, while providing sufficient resonant operation. If, for example, the RF system employs a carrier frequency of 2.45 GHz, the corresponding signal wavelength would be approximately 12 cm and the half-wavelength needed for resonant operation would be approximately 6 cm. This figure is only approximate, in part because the wavelength of interest is not the wavelength in free space, but is the effective wavelength in the mixture of free space and the antenna material. In other words, the electrical length of the antenna—not the physical length of the antenna—should be approximately half the wavelength of the carrier frequency. If the longest dimension of the tag 100, i.e., the diameter of the tag in this exemplary embodiment, is less than 4 cm, then the meander configuration permits the inclusion of an antenna that has a total length approximately equal to a half-wavelength. For example, a half wavelength of 6 cm could be approximately provided by six meander sections of 10 mm each. In practice, an antenna having an electrical length somewhat less than the half-wavelength would provide a reduced read range for the tag 100 that may nevertheless be acceptable for many applications. It should be appreciated that if the meanders are placed too closely to one another, there may be interactions between the meanders that can degrade the performance of the antenna.

The real part of the antenna input impedance is changed by adjusting the loading bar length, width, and/or spacing distance and/or the number of loading bars. These changes are implemented to reduce the real part of the antenna input impedance to make it small enough to develop an adequate voltage, $V_P$, to operate the front end 22 and signal processing circuitry 24 of the RF transponder 20 (see FIG. 1). In a preferred embodiment, the real part of the antenna input impedance is reduced to the point at which $V_P$ no longer increases.

The tuning stubs act as a two-conductor transmission line that is terminated either in a short-circuit or open-circuit. A short-circuited stub acts as a lumped inductor when the length of the transmission line is within odd multiples of one-quarter wavelength of the operative frequency. An open-circuited stub acts as a lumped capacitor when the length of the transmission lines is within odd multiples of one-quarter of the guided wavelength. The magnitude of these lumped capacitors and inductors is affected not only by the material surrounding the stub, but also by the stub length, stub conductor width, and stub conductor spacing. Zero or more short-circuited stubs and zero or more open-circuited stubs are added to one or more of the antenna elements to change the reactive part of the antenna input impedance. In a preferred embodiment, the reactive part of the antenna input impedance is changed to equal the negative magnitude of the reactive part of the front end input impedance. This gives the maximum voltage for a given real part of the antenna input impedance and the maximum power transfer between the antenna and the front end.

It should be appreciated that the loading bar changes the real part of the antenna input impedance, and that changes to the length of the antenna affect the reactive part of the antenna impedance while minimally affecting the real part of the antenna input impedance. Similarly, adding the tuning stubs changes the reactive part of the antenna input impedance while the real part of the antenna input impedance is minimally affected. Therefore, tuning of the real and reactive parts of the antenna impedance may be essentially decoupled by using the loading bar and tuning stubs.

Figure 3:
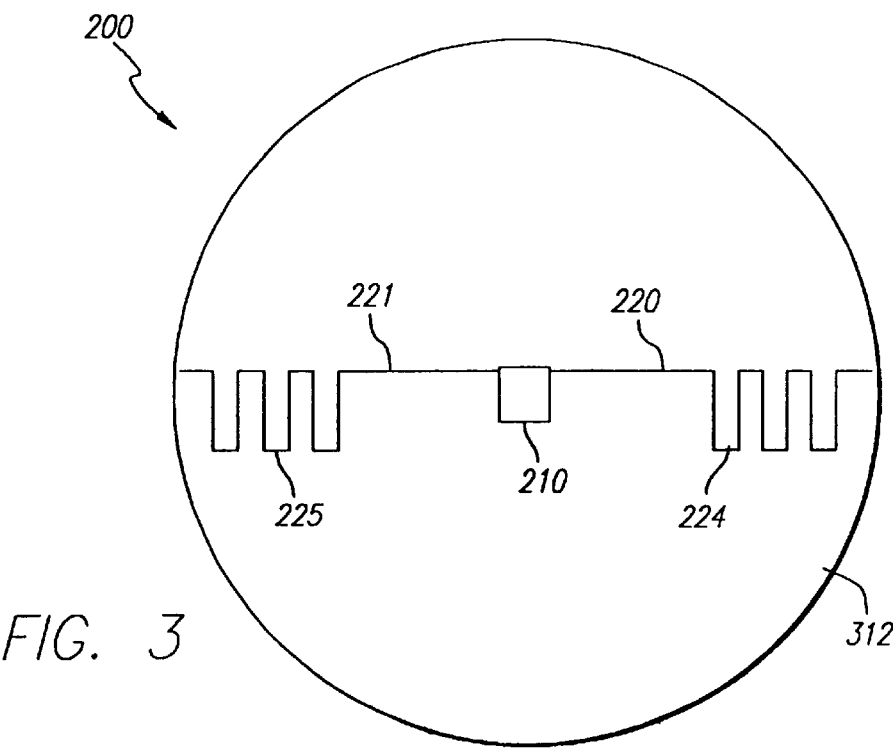
FIG. 3 is a top plan view of an illustrative embodiment of an RF tag that employs a combination of a straight dipole antenna and meander antenna.

A second embodiment of an RF tag 200 is illustrated in FIG. 3, which includes a combination straight dipole/meander antenna. The RF tag 200 includes an RF IC 210 that is affixed in a conventional manner to a substrate 212. As in the preceding example, the substrate 212 may be comprised of a flexible or rigid material, with a generally circular or oval shape and diameter roughly equivalent to a button or coin (e.g., less than 4 cm). The combination antenna includes straight dipole elements 220, 221 and meander elements 224, 225 that are constructed as described above. The combination antenna of FIG. 3 provides the necessary antenna length without any unnecessary meander. The meander sections may be placed relatively close to the tag IC 210, or may be moved outwardly toward the perimeter of the substrate 212. The proportion of the antenna length devoted to straight dipole sections and to meander sections may vary according to an intended application. The combination antenna may further include loading bars and/or tuning stubs as described above.

Figure 4:
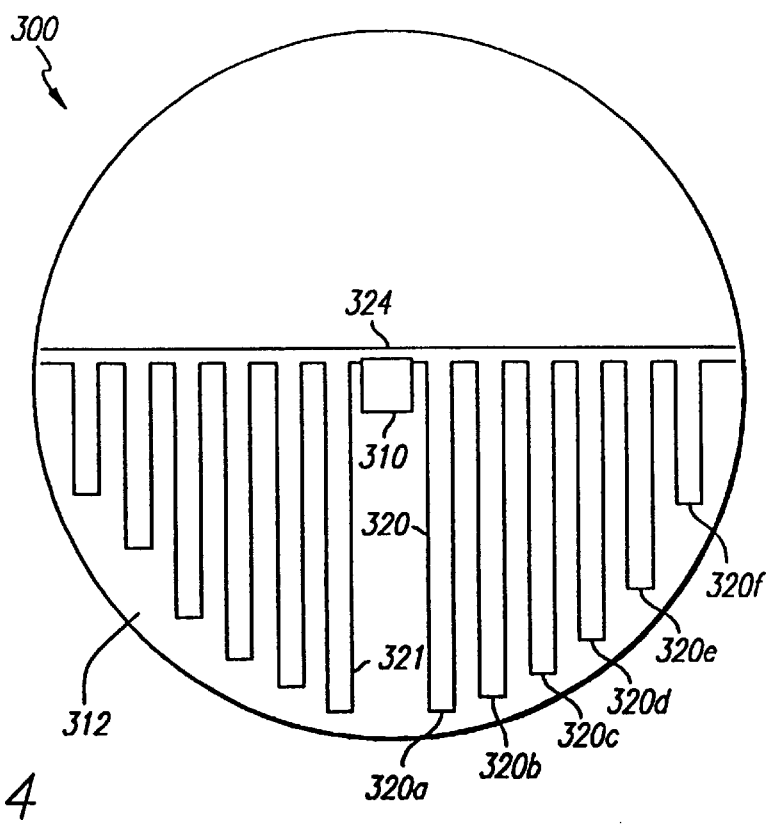
FIG. 4 is a top plan view of an illustrative embodiment of an RF tag that includes a non-uniform meander antenna.

A third embodiment of an RF tag 300 is illustrated in FIG. 4, which includes a non-uniform meander antenna. The RF tag 300 includes an RF IC 310 that is affixed in a conventional manner to a substrate 312. As in the preceding examples, the substrate 312 may be comprised of a flexible or rigid material, with a generally circular or oval shape and diameter roughly equivalent to a button or coin (e.g., less than 4 cm). The non-uniform meander antenna includes meander dipole elements 320, 321, which each further comprise individual meanders 320a–320f that have successively decreasing lengths. The non-uniform meander antenna, as with all the antennas set forth in this description, may employ one or more loading bars, such as loading bar 324, and/or one or more tuning stubs. The non-uniform meander antenna permits resonant operation in the relatively confined space of a small RFID tag 300, and makes maximum use of space on roughly half of the surface of the substrate 312, thereby permitting the use of a smaller tag at a given carrier frequency.

Figure 5:
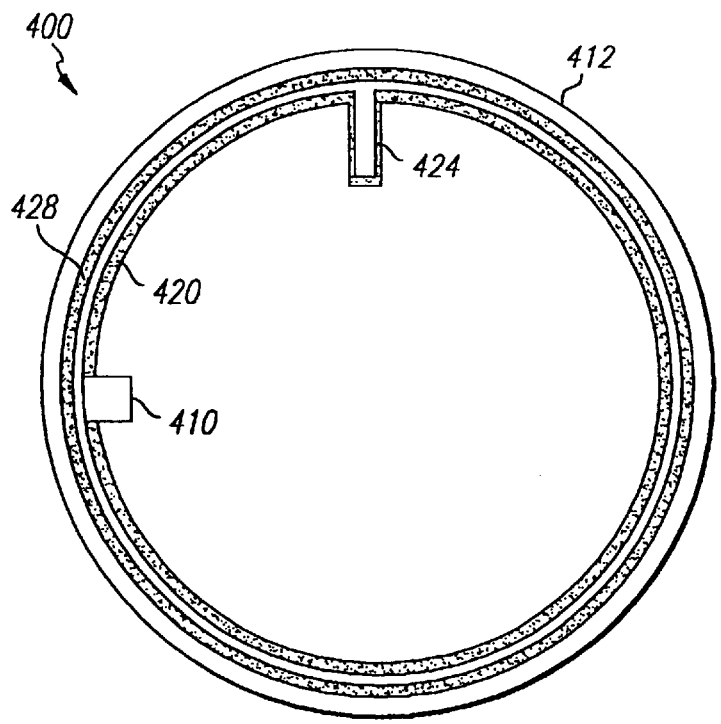
FIG. 5 is a top plan view of an illustrative embodiment of an RF tag that employs a bent dipole antenna.

A fourth embodiment of an RF tag 400 is illustrated in FIG. 5, which includes a "bent dipole" antenna. In a bent-dipole, the two dipole elements are bent around until they meet, essentially forming a loop. The RF tag 400 includes an RF IC 410 that is affixed in a conventional manner to a substrate 412. As in the preceding examples, the substrate 412 may be comprised of a flexible or rigid material, with a generally circular or oval shape and diameter roughly equivalent to a button or coin (e.g., less than 4 cm). The bent dipole antenna includes a loop 420 that is concentrically disposed within the perimeter of the substrate 412. The bent-dipole antenna configuration avoids the interference problems associated with the meander antennas of previous embodiments, yet provides sufficient antenna length to meet the desired half-wavelength threshold. The bent dipole antenna 420 will generally take up more space than the meander or non-uniform meander antennas described above, and therefore would likely be employed with a larger sized tag than that previously described. A loading bar 428 forms a closed loop disposed concentrically outward from the bent-dipole antenna 420. A tuning stub 424 is also employed in this illustrative embodiment to match the impedance of the antenna to the tag IC 410.

Figure 6:
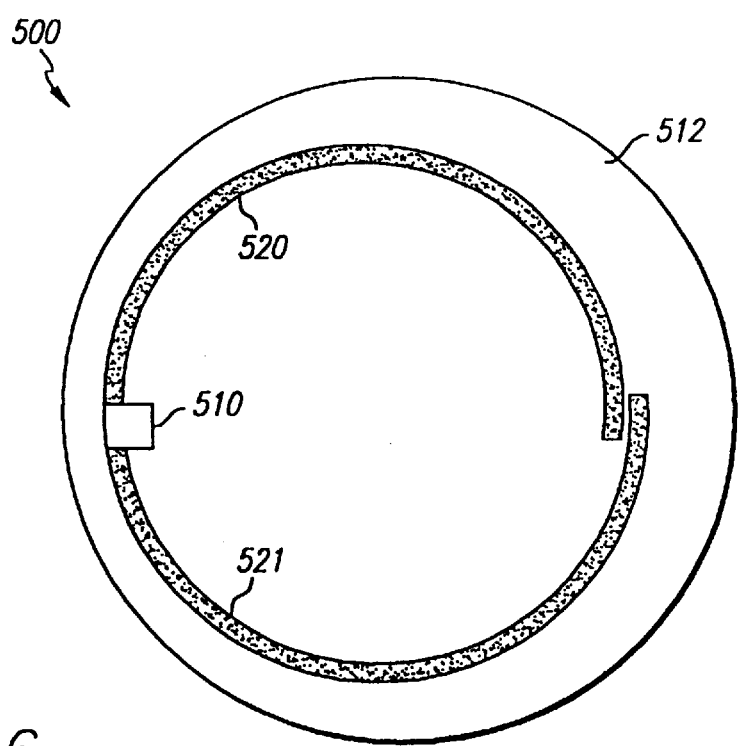
FIG. 6 is a top plan view of an illustrative embodiment of an RF tag that employs spiral antenna.

A fifth embodiment of an RF tag 500 is illustrated in FIG. 6, which includes a spiral antenna, such as an Archimedes spiral. The RF tag 500 includes an RF IC 510 that is affixed in a conventional manner to a substrate 512. As in the preceding examples, the substrate 512 may be comprised of a flexible or rigid material, with a generally circular or oval shape and diameter roughly equivalent to a button or coin (e.g., less than 4 cm). The spiral antenna includes dipole elements 520, 521 that are bent toward each other like the bent dipole antenna, but do not meet at the respective ends. The spiral type antenna provides flexibility in matching the impedance of the antenna to the tag IC 510, as well as providing flexibility in obtaining circular polarization, when desired. As with the previous examples, the spiral antenna provides sufficient antenna length in the confined space available on the substrate 512.

Figure 7:
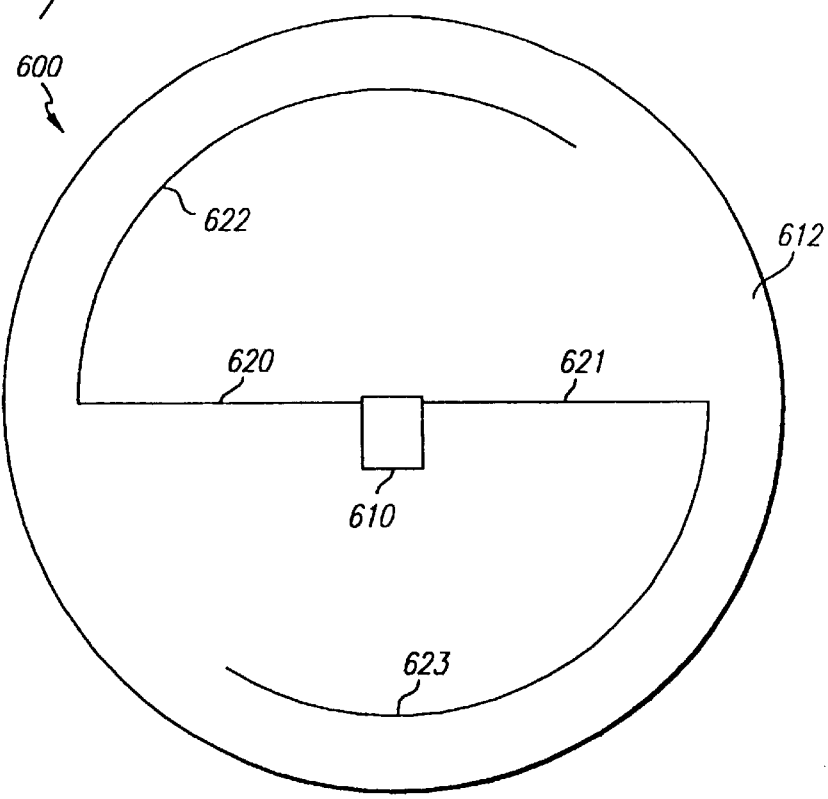
FIG. 7 is a top plan view of an illustrative embodiment of an RF tag that employs a "z-shaped" antenna.

A sixth embodiment of an RF tag 600 is illustrated in FIG. 7, which includes a z-shaped antenna. The RF tag 600 includes an RF IC 610 that is affixed in a conventional manner to a substrate 612. As in the preceding examples, the substrate 612 may be comprised of a flexible or rigid material, with a generally circular or oval shape and diameter roughly equivalent to a button or coin (e.g., less than 4 cm). The z-shaped antenna includes dipole elements 620, 621 that extend outwardly in the manner of a straight dipole, and curved extensions 622, 623 from the dipole elements that curve to follow the perimeter of the substrate 612.

Figure 8:
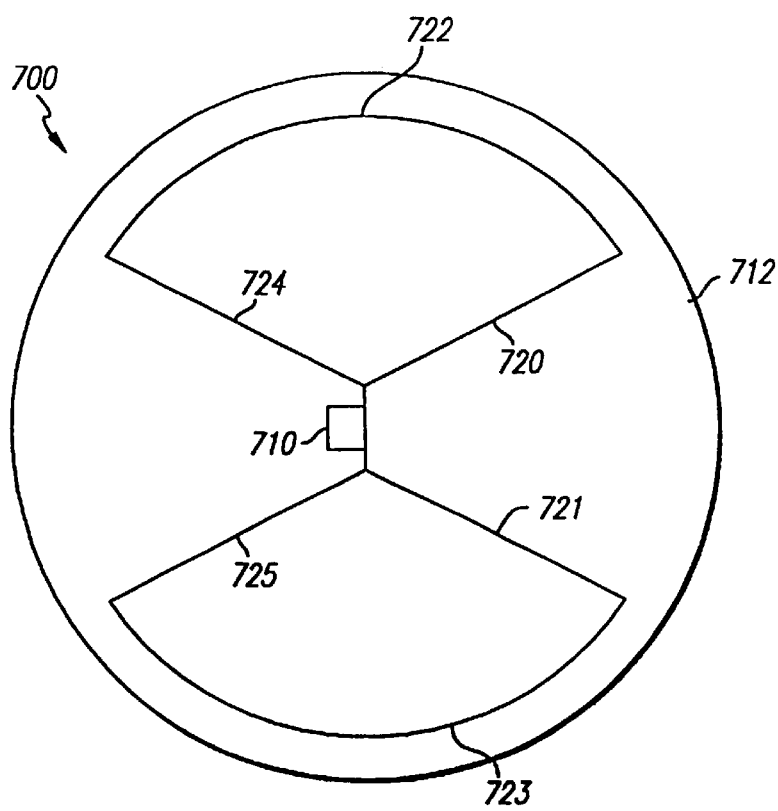
FIG. 8 is a top plan view of an illustrative embodiment of an RF tag that employs an antenna which is a combination of a spiral and a non-uniform meander antenna.

A seventh embodiment of an RF tag 700 is illustrated in FIG. 8, which includes a dipole antenna having elements that are squeezed to define pie-shaped regions. The RF tag 700 includes an RF IC 710 that is affixed in a conventional manner to a substrate 712. As in the preceding examples, the substrate 712 may be comprised of a flexible or rigid material, with a generally circular or oval shape and diameter roughly equivalent to a button or coin (e.g., less than 4 cm). The "sqeezed dipole" antenna includes a first dipole element formed by segments 720, 722, 724 that are coupled together into a first loop, and a second dipole element formed by segments 721, 723, 725 that are coupled together into a second loop. The "squeezed dipole" antenna maximizes antenna length for the confined space of the substrate 712.

Figure 9:
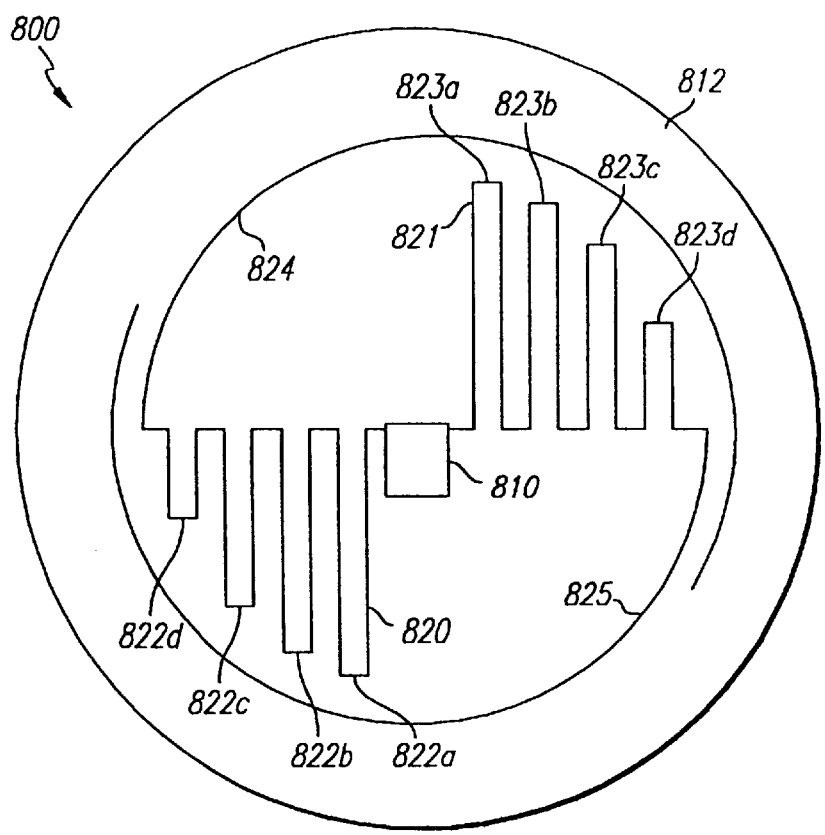
FIG. 9 is a top plan view of an illustrative embodiment of an RF tag that employs an antenna that is a combination of a non-uniform meander and a pinched dipole antenna.

Combinations of the basic antenna shapes set forth above may be employed to optimize performance, cost, and other design factors. An eighth embodiment of an RF tag 800 is illustrated in FIG. 9, which includes a combination of a non-uniform meander and spiral antenna. The RF tag 800 includes an RF IC 810 that is affixed in a conventional manner to a substrate 812. As in the preceding examples, the substrate 812 may be comprised of a flexible or rigid material, with a generally circular or oval shape and diameter roughly equivalent to a button or coin (e.g., less than 4 cm). The non-uniform meander portion of the antenna includes meander dipole elements 820, 821, which each further comprises individual meanders 822a–822d, 823a–823d that have successively decreasing lengths. The spiral portion of the antenna includes curved extensions 824, 825 from the dipole elements that curve to follow the perimeter of the substrate 812.

Figure 10:
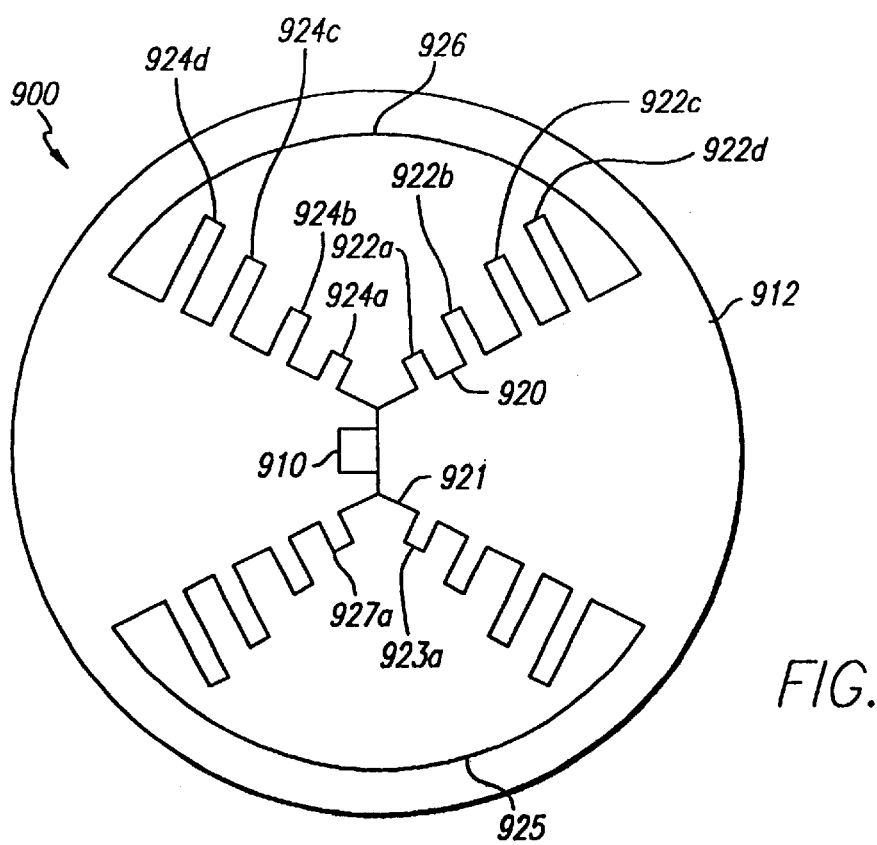
FIG. 10 is a top plan view of an illustrative embodiment of an RF tag that employs a pinched dipole antenna.
Figure 11:
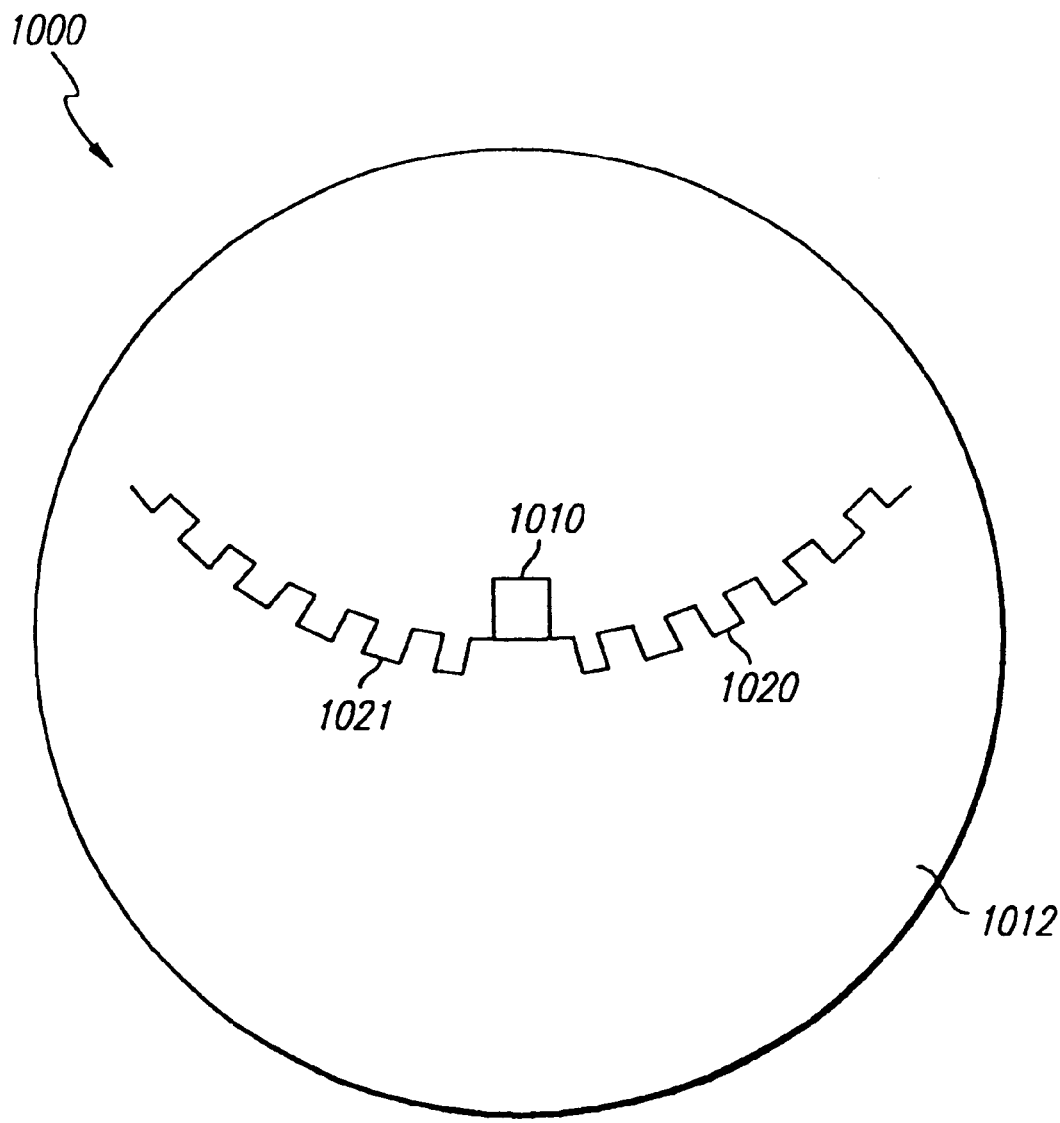
FIG. 11 is a top plan view of an illustrative embodiment of an RF tag that employs a bent meander antenna.

A ninth embodiment of an RF tag 900 is illustrated in FIG. 10, which includes a combination of a non-uniform meander and a "squeezed dipole" antenna. The RF tag 900 includes an RF IC 910 that is affixed in a conventional manner to a substrate 912. As in the preceding examples, the substrate 912 may be comprised of a flexible or rigid material, with a generally circular or oval shape and diameter roughly equivalent to a button or coin (e.g., less than 4 cm). The antenna includes a first dipole element 920 that is split to form a loop having non-uniform meander sections 922a–922d and 924a–924d connected by an arcuate section 926, and a second dipole element 921 that is split to form a loop having non-uniform meander sections 923a–923d and 927a–927d connected by an arcuate section 925. A tenth embodiment of an RF tag 1000 is illustrated in FIG. 11, which includes a combination of a meander and a "bent dipole" antenna. The RF tag 1000 includes an RF IC 1010 that is affixed in a conventional manner to a substrate 1012. As in the preceding examples, the substrate 1012 may be comprised of a flexible or rigid material, with a generally circular or oval shape and diameter roughly equivalent to a button or coin (e.g., less than 4 cm). The antenna includes dipole elements 1021, 1022 having uniform meander sections that follow a generally curved path.

Any of the foregoing antenna configurations may be used in cooperation with a ground plane located on the opposite side of the substrate. A plurality of antennas may be combined on the same substrate to provide circular or dual linear polarization with wider bandwidths than a single antenna would provide. Additionally, the plated and etched antenna structures may be replaced by their slot counterparts, whereby the conductive material is replaced by a slot in a conductive surface, such as a metallized surface. In such a case, the slot may be "backed up" by a ground plane or cavity for improved gain and bandwidth performance.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims ended hereto.

What is claimed is:

1. An RF transponder including a front end, signal processor, and a memory, said transponder comprising:

a substrate;

an RF integrated circuit disposed on said substrate;

an antenna provided on said substrate and coupled to said RF integrated circuit, said antenna having an electrical length that is greater than a maximum length dimension of said substrate and having an input impedance including a real component and a reactive component;

at least one loading bar spaced from said antenna, wherein at least one of a bar length, bar width, spacing and number of bars of said at least one loading bar is selectively adjusted to reduce said real component of said input impedance of said antenna such that sufficient voltage is transmitted to said front end to operate said front end and said signal processor of said transponder; and at least one tuning stub coupled to said antenna, wherein at least one of a stub length, stub conductor width, and stub conductor spacing is selectively adjusted to change said reactive component of said input impedance of said antenna such that said reactive component of said antenna substantially equals a negative magnitude of a reactive part of an input impedance of said front end.

2. The RF transponder of claim 1, wherein said antenna further comprises a meander antenna.

3. The RF transponder of claim 1, wherein said antenna further comprises a combination of a straight dipole and a meander antenna.

4. The RF transponder of claim 1, wherein said antenna further comprises a non-uniform meander antenna.

5. The RF transponder of claim 1, wherein said antenna further comprises a bent dipole antenna.

6. The RF transponder of claim 1, wherein said antenna further comprises a spiral antenna.

7. The RF transponder of claim 1, wherein said antenna further comprises a z-shaped dipole.

8. The RF transponder of claim 1, wherein said antenna further comprises a squeezed dipole antenna.

9. The RF transponder of claim 1, wherein said antenna further comprises a combination of a non-uniform meander and a spiral antenna.

10. The RF transponder of claim 1, wherein said antenna further comprises a combination of a non-uniform meander and a squeezed dipole.

11. The RF transponder of claim 1, wherein said substrate further comprises a generally circular shape and said maximum length dimension of said substrate further comprises a diameter of approximately 4 cm.

12. A method for fabricating an RF transponder on a small form factor substrate, said transponder including a front end, signal processor, and memory, said method comprising:

disposing an RF integrated circuit on said substrate;

forming an antenna on said substrate in electrical connection with said RF integrated circuit, said antenna having an electrical length that is greater than a maximum length dimension of said substrate and having an input impedance including a real component and a reactive component;

forming at least one loading bar spaced from said antenna such that sufficient voltage is transmitted to said front end to operate said front end and said signal processor of said transponder; and forming at least one tuning stub coupled to said antenna such that said reactive component of said input impedance of said antenna substantially equals a negative magnitude of a reactive part of an input impedance of said front end.

13. The method of claim 12, wherein said antenna forming step further comprises forming a meander antenna.

14. The method of claim 12, wherein said antenna forming step further comprises forming a combination of a straight dipole antenna and a meander antenna.

15. The method of claim 12, wherein said antenna forming step further comprises forming a non-uniform meander antenna.

16. The method of claim 12, wherein said antenna forming step further comprises forming a bent dipole antenna.

17. The method of claim 12, wherein said antenna forming step further comprises forming a spiral antenna.

18. The method of claim 12, wherein said antenna forming step further comprises forming a z-shaped dipole antenna.

19. The method of claim 12, wherein said antenna forming step further comprises forming a squeezed dipole antenna.

20. The method of claim 12, wherein said antenna forming step further comprises forming a combination of a non-uniform meander and a spiral antenna.

21. The method of claim 12, wherein said antenna forming step further comprises forming a combination of a non-uniform meander and a squeezed dipole antenna.

* * * * *